United States Patent [19]

Jones, Jr.

[11] 4,013,152

[45] Mar. 22, 1977

[54] MECHANICAL CLUTCH FOR CYCLIC MACHINES

[75] Inventor: Clarence O. Jones, Jr., Eggertsville, N.Y.

[73] Assignee: Niagara Machine & Tool Works, Buffalo, N.Y.

[22] Filed: Jan. 9, 1976

[21] Appl. No.: 647,893

[52] U.S. Cl. .................. 192/24; 74/526; 192/33 R; 192/129 R

[51] Int. Cl.² .................................... F16D 11/04

[58] Field of Search ......... 192/24, 25, 33 R, 129 R; 74/526

[56] References Cited

UNITED STATES PATENTS

| | | | |
|---|---|---|---|
| 991,879 | 5/1911 | Niemeyer | 192/24 X |
| 1,367,309 | 2/1921 | Dunham | 192/24 |
| 1,939,006 | 12/1933 | Hawkins | 192/24 X |
| 2,057,905 | 10/1936 | Munschauer | 192/24 |
| 2,917,944 | 12/1959 | Hills | 74/526 |
| 3,147,836 | 9/1964 | Atkinson | 192/129 R |

*Primary Examiner*—Allan D. Herrmann
*Attorney, Agent, or Firm*—Christel & Bean

[57] ABSTRACT

Single revolution clutch mechanisms are conventionally employed in machines such as punch presses and the like. Such clutches are usually provided with single stroke mechanisms so that an operator must release the "RUN" buttons before a subsequent cycle can be initiated. The present invention shows apparatus which prevents the initiation of a subsequent cycle of operation whenever the single stroke mechanism comes into operation. A latch is released upon such operation of the single stroke mechanism which prevents operation of the cycle-initiating means by the operator and requires the services of a maintenance man at the clutch mechanism to restore the clutch-initiating and single stroke mechanism to operating condition.

4 Claims, 4 Drawing Figures

MECHANICAL CLUTCH FOR CYCLIC MACHINES

BACKGROUND AND SUMMARY OF THE INVENTION

This invention relates to full revolution clutch mechanisms for cyclic machines such as power presses and the like wherein the clutch, after a cycle of operation is initiated by engagement of the clutch parts, automatically releases at the end of a cycle of operation.

A representative mechanical clutch mechanism of the type here under consideration is shown in Munschauer U.S. Pat. No. 2,057,905, dated Oct. 20, 1936. In this prior art mechanism selective means are provided for the operator to run the press either in a continuous or single stroke mode. In the single stroke mode means are provided so that if the operator fails to release the clutch, single stroke mechanism comes into play for insuring disengagement of the clutch at the end of such cycle of operation.

In modern practice using two hand tripping devices, the ability to select continuous operation has been eliminated. The mechanical foot treadle means of clutch actuation has been eliminated and replaced by electric run buttons which require the use of both of the operator's hands to initiate a cycle of operation. The electric control circuitry associated with the two run buttons provides for simultaneous actuation of both buttons, non-tie-down of the buttons and single stroke. The mechanical single stroke mechanism in the aforesaid prior U.S. Pat. No. 2,507,905 is retained as a back-up device but in a modified form. Should the mechanical single stroke mechanism be caused to function as a back-up device, a latch is released upon such operation of the mechanical single stroke mechanism which prevents reactivation of the cycle-initiating means by the operator and requires the services of a maintenance man at the clutch mechanism to restore the clutch-initiating and single stroke mechanism to operating condition.

DESCRIPTION OF THE ILLUSTRATED EMBODIMENT

The clutch mechanism of the present invention is associated with a power press or a similar machine in the manner more fully set forth and illustrated in the aforesaid prior U.S. Pat. No. 2,057,905 and the construction and operation of power press single revolution clutches of this type is well known to those skilled in the power press art. It is accordingly necessary here to illustrate and describe only the clutch mechanism per se.

Figure 1:
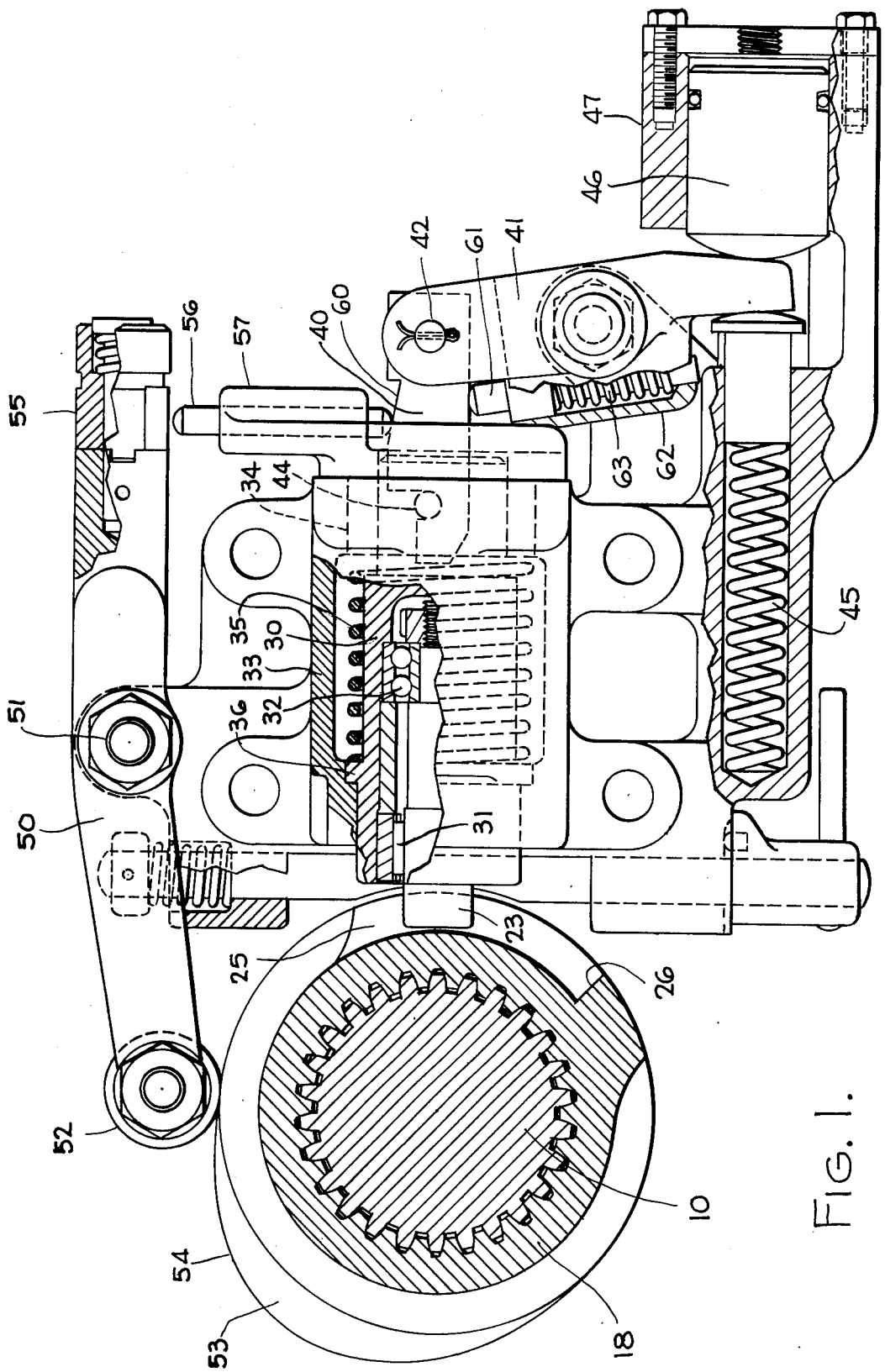
FIG. 1 is a cross-sectional view of one form of the apparatus of the present invention taken on a vertical plane at right angles to the main or eccentric shaft of the machine.
Figure 2:
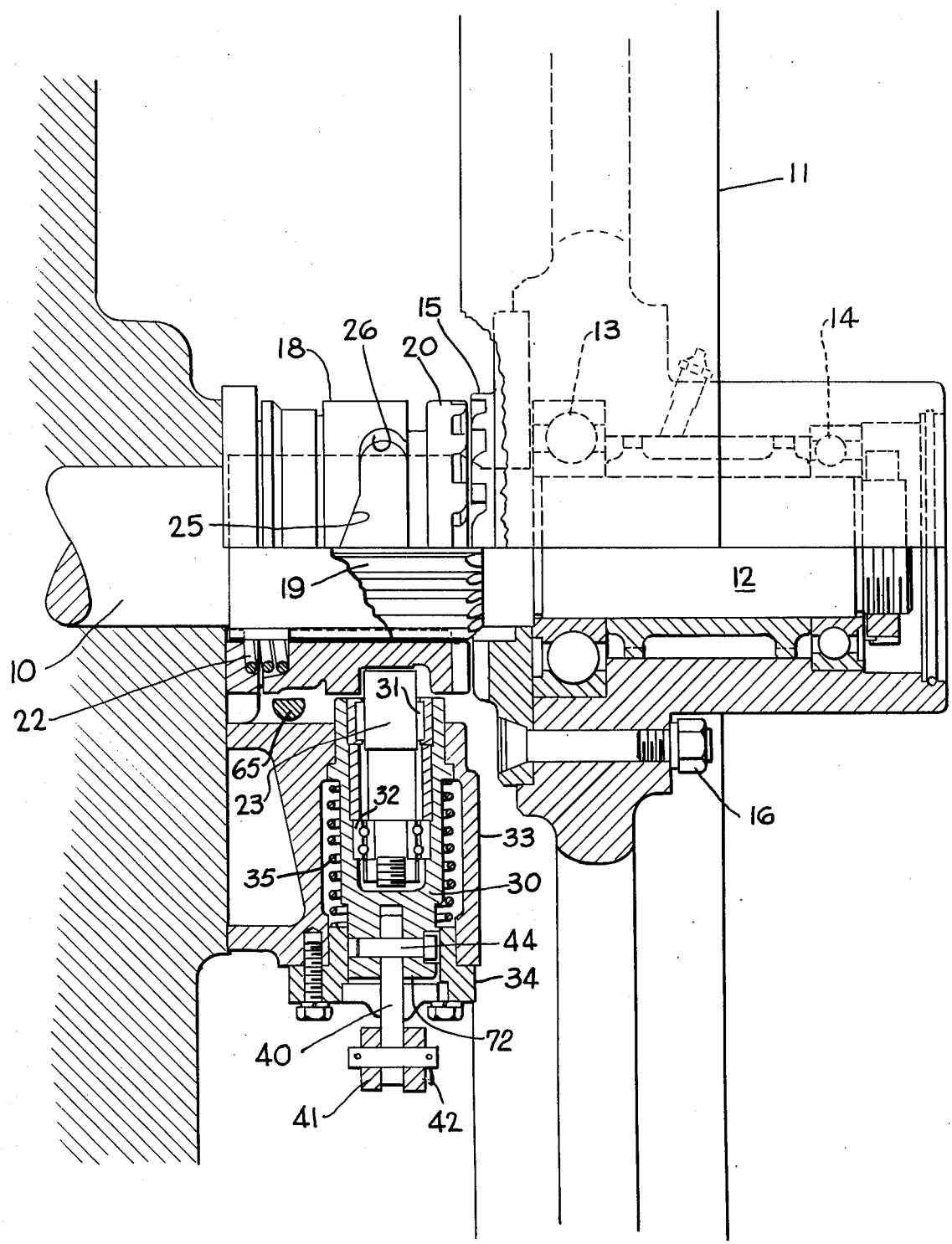
FIG. 2 is a cross-sectional view taken generally on the line II—II of FIG. 1.

In FIGS. 1 and 2 the numeral 10 designates a main or eccentric shaft of a power press which carries an eccentric or crank for reciprocating a power press slide upon rotation of the main shaft. A flywheel 11 is mounted for free rotation on a reduced outer extension 12 of main shaft 10, in the present instance by means of ball bearings 13 and 14. An annular jaw clutch element 15 is fixed to flywheel 11 as by means of nut and bolt connections 16.

A sleeve clutch element 18 is mounted on main shaft 10 for rotation therewith by means of a spline connection 19 which permits free movement of sleeve clutch element 18 in an axial direction between the released position shown in FIG. 2 and an engaged position wherein the sleeve clutch has moved to the right from the illustrated position whereby an annular jaw clutch portion 20 engages the jaw clutch element 15 which is fixed to flywheel 11.

The sleeve clutch element 18 is normally urged to engaged position by a compression coil spring 22 and is moved to and held in disengaged position by operation of a throwout pin 23. Sleeve clutch 18 has a cam surface 25 and a pin-receiving abutment 26. The engagement of cam surface 25 against pin 23 withdraws sleeve clutch 18 from engagement with clutch element 15. All of the foregoing is conventional and well known.

The clutch parts are shown in FIG. 2 in relative positions which do not actually occur since the sleeve clutch 18 is shown in a withdrawn position while the pin 23 is not in engagement with cam surface 25 or abutment 26. This distorted position of the parts is shown merely for clarity of illustration.

Clutch throwout pin 23 is journaled in a tubular housing 30 by means of anti-friction bearings 31 and 32 and tubular housing 30 is guided at one end in an opening formed in a bracket or casing 33 and at its other end is guided in a bushing 34 which is secured to casing 33. The tubular housing 30 is yieldably held in its projected position by a compression coil spring 35 which bears at one end against a flange 36 on tubular housing 30 and at its other end against the inner end of bushing 34.

In the projected positions of housing 30 and throwout pin 23 the latter is moved into the path of cam formation 25 of sleeve clutch member 18 and thus effects disengagement of clutch sleeve 18 from the clutch member 15.

The slidable tubular housing 30 and its contained throwout pin 23 are withdrawn from engagement with sleeve clutch 18 by means of a an actuating member in the form of link 40 which is pivotally connected to a bell crank lever 41 as at 42. Link 40 is shown in detail in FIG. 3. The opposite end of link 40 has a hook formation for engagement over a cross pin 44 which extends across a slot formed in the adjacent end of tubular housing 30.

Link 40 is normally held in its illustrated position of FIG. 1 by a compression coil spring 45 and is moved to withdraw throwout pin 23 from engagement with sleeve clutch 18 by means of an air operated piston 47 which engages against a tail portion of bell crank lever 41. Piston 46 is disposed in a cylinder portion 47 of the clutch frame and an air pressure connection 48 at one end of the cylinder, when energized, moves piston 46 against the tail portion of bell crank 41 to move link 40 to withdrawn position.

It is conventional in clutch control systems of this general type to control operating pressure to cylinder 47 by electromagnetic means and such means, as mentioned earlier herein, provide electrical circuit means for preventing continuous operation by merely holding the cycle initiating buttons in the RUN position. This arrangement is also conventional and is referred to in the art as a "non-repeat" arrangement. In FIG. 2 the flattened rod 65 is rotated to lock the sleeve clutch against engaging movement. This feature is entirely conventional and has been used for many years and forms no part of the present invention.

The embodiment of the present invention illustrated in the drawings further includes means for effectively preventing continued operation of the machine when the throwout pin does not move to cycle-terminating position.

A bell crank lever 50 is pivoted medially to the clutch frame as at 51 and has a cam roller 52 at one end for engagement with a cam 53 which is fixed for rotation with main shaft 10. Cam 53 has a rise portion 54 which passes cam roller 52 during the last part of a cycle of operation, the direction of rotation of shaft 10 and cam 53 being counterclockwise as viewed in FIG. 1.

The end of bell crank lever 50 is provided with an eccentric member 55 which is rotatably adjustable to vary its distance from the end of a pin 56 which is yieldably mounted in a bearing formation 57 of clutch bracket or casing 33. The opposite end of pin 56 is axially movable against link 40 as shown in FIG. 1 and the latter is provided with an angular notch 60.

Link 40 is normally urged in a clockwise direction by a pin 61 which is housed in a bearing formation 62 formed on bell crank lever 41. A compression coil spring 63 acts against an enlargement of pin 61 to urge the latter against link 40.

As the cam rise 54 acts against cam roller 52 during the last portion of a cycle of rotation of shaft 10 the eccentric member 55 moves against the adjacent end of pin 56 and tends to move pin 56 slidably against link 40 to impart a certain degree of counterclockwise pivotal movement to link 40. If the throwout pin 23 has moved to the position illustrated in FIG. 1 to cam the clutch sleeve 18 out of clutching engagement the degree of movement of link 40 will not be sufficient to disengage the same from pin 44 which is carried by tubular housing 30.

If pin 23 has not moved toward clutch sleeve 18 to properly terminate a cycle of operation link 40 will be in a position more to the right than as shown in FIG. 1 and thus the surface of link 40 which is engaged by pin 56 will be moved more toward pin 56 as viewed in FIG. 1 for two reasons. First, the position of link 40 will cause pin 56 to engage the same to the left of notch 60 and, second, the arcuate movement of pivot 42 will move the pivot upwardly as viewed in FIG. 1 and consequently further move the abutting surface of link 40 toward pin 56.

Due to these two factors, movement of bell crank lever 50 by cam 53 with bell crank lever 41 in cycle-initiating position will cause pin 56 to be moved against link 40 by eccentric member 55 a sufficient degree to unlatch link 40 from pin 44 and free throwout pin 23 and tubular housing 30 for free movement toward clutch sleeve 18 under the impetus of spring 35.

As stated above, the foregoing is all conventional single revolution clutch construction of a type which is known particularly in the power press art. However, with this construction, and despite the unlatching produced by the operation of bell crank lever 50 as aforesaid, it is possible for an operator to release the cycle initiating means so that bell crank lever 41 moves to project link 40 to the left to relatch with pin 44 and the operator can then operate the cycle-initiating means to move bell crank lever 41 clockwise and link 40 to the right to institute a subsequent cycle of operation.

The present invention provides means whereby, when link 40 has been released from pin 44 by operation of bell crank lever 50 which has prevented throwout pin 23 from effecting normal release of sleeve clutch 18, a subsequent cycle of operation cannot be instituted.

Figure 3:
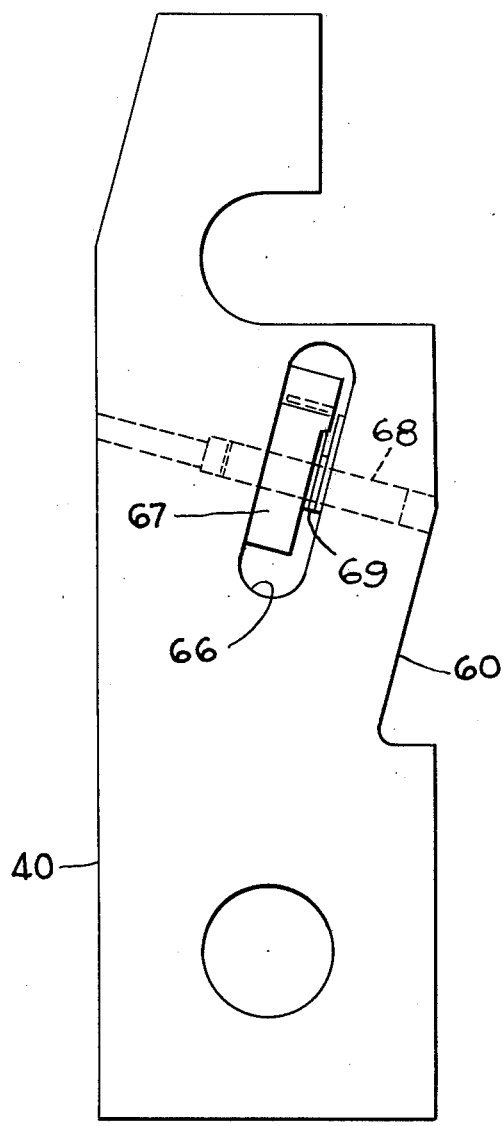
FIG. 3 is a detailed elevational view of a latch member connecting between the cycle-initiating means and the clutch throwout pin viewed generally as in FIG. 1.
Figure 4:
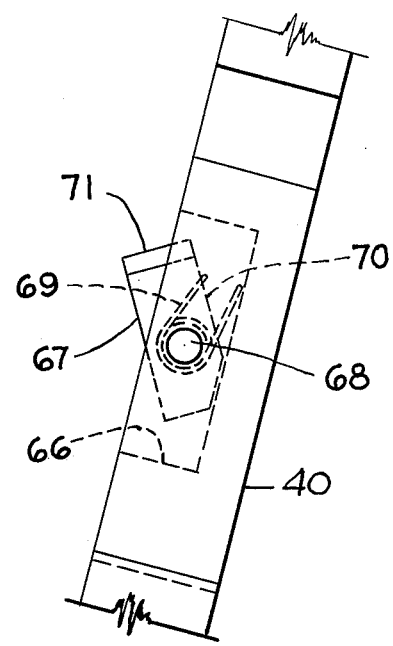
FIG. 4 is a fragmentary side elevational view of the latch member of FIG. 3.

Referring now particularly to FIGS. 3 and 4, link 40 has a recess 66 which receives a pawl member 67 which is secured in the recess by a pivot pin 68. A torsion spring 69 on pivot pin 68 has an end portion 70 which bears against pawl 67 and urges the latter toward the outward position illustrated in FIG. 4.

Pawl 67 is normally held in an opposite pivotal position wherein it is entirely housed within recess 66 by virtue of the slotted lower end of tubular housing member 30. When link 40 becomes disconnected from pin 44 of tubular housing 30, which will only occur when bell crank lever 41 is in a cycle-initiating position and link 40 is in a right-hand position as viewed in FIG. 1, the tubular housing 30 and throwout pin 23 are moved upwardly to the left toward shaft 10 by coil spring 35. This moves the portion of link 40 which houses pawl 67 to the right relative to tubular housing 30 to a point where pawl 67 is released from between the walls of the slot in the lower end of tubular housing 30.

Thus the pawl moves outwardly of recess 66 to a sufficient degree that the portion of pawl 67 which is marked 71 in FIG. 4 moves beneath the lower end 72 of tubular housing 30 and thus effectively prevents upward movement of link 40 to reengage with pin 44 of tubular housing 30. In this position throwout pin 23 is in the clutch disengaging position illustrated in FIGS. 1 and 2 and link 40 is in its right-hand position as viewed in FIG. 1.

The operation of pawl 67 thus positively prevents the initiation of a subsequent cycle of operation by the machine operator and it is necessary for him to call a maintenance man or mechanic to release pawl 67 from beneath the lower end of member 30 to condition the mechanism for normal cycle-terminating operation of throwout pin 23.

A preferred embodiment of the present invention has been described herein and shown in the accompanying drawings to illustrate the underlying principles of the invention but it is to be understood that numerous modifications may be made without departing from the broad spirit and scope of the invention.

I claim:

1. A single revolution clutch mechanism comprising a main shaft, a driving member rotatable on said shaft, a coupling member rotatable with said shaft and axially movable to engage and disengage said driving member and said shaft, a throwout member movable to a coupling-disengaging position, an actuating member releasably connected to said throwout member and selectively operable to move said throwout member away from said coupling-disengaging position for producing driving engagement between said driving member and said shaft, means for detaching said actuating member from said throwout member at the end of a cycle of revolution if the throwout member has not moved to coupling-disengaging position, and a latch rendered operative by detachment of said actuating member from said throwout member to prevent further operation of said actuating member until the condition causing said detachment has been corrected.

2. A clutch mechanism according to claim 1 wherein said latch is pivoted to said actuating member and is held in inoperative position when said actuating member is connected with said throwout member and is released for latching operation by and upon detachment of said actuating member from said throwout member.

3. A clutch mechanism according to claim 1 wherein said latch is disposed in a recess in said actuating member, spring means biasing said latch to latching position, said latch being held within the confines of said recess when said actuating member is attached to said throwout member.

4. A clutch mechanism according to claim 1 wherein said latch is disposed in a recess in said actuating member, spring means biasing said latch to latching position, said latch being held within the confines of said recess when said actuating member is attached to said throwout member, said latch being released from confinement within said recess by detachment of said actuating member from said throwout member whereupon said spring means moves the latch to latching position to prevent further operation of said actuating member.

* * * * *